(12) United States Patent
Kasianova et al.

(10) Patent No.: US 9,212,296 B2
(45) Date of Patent: Dec. 15, 2015

(54) ORGANIC COMPOUND, OPTICAL FILM AND METHOD OF PRODUCTION THEREOF

(71) Applicant: CRYSOPTIX KK, Tokyo (JP)

(72) Inventors: Irina Kasianova, Moscow Region (RU); Darya Yurchenko, Moscow (RU)

(73) Assignee: CRYSOPTIX KK, Tokyo (JP)

( * ) Notice: Subject to any disclaimer, the term of this patent is extended or adjusted under 35 U.S.C. 154(b) by 28 days.

(21) Appl. No.: 14/109,850

(22) Filed: Dec. 17, 2013

(65) Prior Publication Data

US 2014/0186637 A1 Jul. 3, 2014

Related U.S. Application Data

(62) Division of application No. 12/426,326, filed on Apr. 20, 2009, now abandoned.

(60) Provisional application No. 61/047,674, filed on Apr. 24, 2008.

(51) Int. Cl.
*C09D 177/06* (2006.01)
*C09K 19/38* (2006.01)
(Continued)

(52) U.S. Cl.
CPC .......... *C09D 177/06* (2013.01); *C09K 19/3804* (2013.01); *C09K 19/3809* (2013.01); *C09K 2019/0444* (2013.01); *Y10T 428/31623* (2015.04); *Y10T 428/31725* (2015.04)

(58) Field of Classification Search
CPC .................................................. C09D 177/06
USPC ......... 428/435, 423.5; 427/162, 471; 524/606
See application file for complete search history.

(56) References Cited

U.S. PATENT DOCUMENTS

| | | |
|---|---|---|
| 4,521,588 A | 6/1985 | Rogers et al. |
| 4,824,916 A | 4/1989 | Kershner et al. |

(Continued)

FOREIGN PATENT DOCUMENTS

| | | |
|---|---|---|
| EP | 961138 A1 | 12/1999 |
| WO | 0181991 A1 | 11/2001 |

OTHER PUBLICATIONS

Bahadur, "Liquid Crystals: Applications and Uses," Liquid Crystals: Applications and Uses, 1990, World Scientific, Singapore-New York, vol. 1, p. 101.

(Continued)

*Primary Examiner* — Duc Truong
(74) *Attorney, Agent, or Firm* — Fisherbroyles LLP; Adam K. Whiting

(57) ABSTRACT

An organic compound has the general structural formula I. In the formula I, Core is a conjugated organic unit capable of forming a rod-like macromolecule, n is a number of the conjugated organic units in the rod-like macromolecule, $G_k$ is a set of ionogenic side-groups, and k is a number of the side-groups in the set $G_k$. The set of the ionogenic side-groups provide solubility of the organic compound or its salts and give rigidity to the rod-like macromolecule. The number n provides molecule anisotropy that promotes self-assembling of macromolecules in a solution of the organic compound or its salts, forming lyotropic liquid crystal. The solution is capable of forming a solid optical retardation layer of positive A-type substantially transparent to electromagnetic radiation in the visible spectral range. An optical film based on an organic compound of the general formula I and a method of making same are also disclosed.

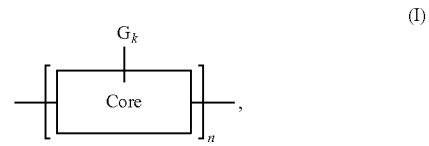

34 Claims, 5 Drawing Sheets

(51) Int. Cl.
C09D 177/00 (2006.01)
C09K 19/04 (2006.01)

(56) References Cited

U.S. PATENT DOCUMENTS

| | | | |
|---|---|---|---|
| 5,578,243 | A | 11/1996 | Mazaki et al. |
| 5,739,296 | A | 4/1998 | Gvon et al. |
| 6,174,394 | B1 | 1/2001 | Gvon et al. |
| 7,163,727 | B2 | 1/2007 | Su et al. |
| 2006/0060821 | A1 | 3/2006 | Fujisawa et al. |
| 2007/0036916 | A1 | 2/2007 | Fujisawa et al. |

OTHER PUBLICATIONS

Fumaki el at., "Shear-Induced Mesophase Organization of Polyanionic Rigid Rods in Aqueous Solution," Langmuir, 2004, vol. 20, pp. 6518-6520.

Sarkar et al., "Rigid rod water-soluble polymers," J. of Applied Polymer Science, 1996, vol. 62, pp. 393-408.

Vandenberg et al., "The synthesis and solution properties of some rigid-chain, water-soluble polymers: Poly[N,N -(sulfophenylene)phthalamide]s and poly[N,N -(sulfo-p-phenylene)pyromellitimide]," J. of Polymer Science, Part A : Polymer Chemistry, 1989, vol. 27, pp. 3745-3757.

Yeh et al., "Optics of Liquid Crystal Displays," New York, John Wiley & Sons, 2010.

Lazarev et al., "Thin Crystal Film Retarders," Proc. of the 7th Int. Display Workshops, Kobe, Japan, Nov. 29-Dec. 1, 2000, pp. 1159-1160.

Passmann et al., "Nematic Ionomers as Materials for the Build-up of Multilayers," Macromolecular Chemistry and Physics, Wiley-vch Verlag, Weinheim, DE, Feb. 1, 1998, vol. 199, No. 2, pp. 179-189.

Ullmann et al., "Ueber symmetrische bephenylderivate," Justus Liebigs Ann. Chem., 1904, No. 332, pp. 38-81.

Fanta, "The Ullmann Synthesis of Biaryls," Chem. Rev., 1964, vol. 64, No. 613, pp. 1945-1963.

Yang et al., "Self-Assembling Structure in Solution of a Semirigid Polyelectrolyte," Macromolecules, 2008, 41 (5), p. 1791.

Rogers et al., "Aromatic copolyamides: Effect of phenylene content on optical, spectral, and solubility properties," J. of Polymer Science, Polymer Chemistry Edition, 1985, vol. 23, pp. 2669-2678.

PCT, International Search Report and Written Opinion of the International Searching Authority in PCT/IB2009/051659, Aug. 31, 2009, 15 pages.

Furukwawa et al., "Anisotropic gelation induced by a rod-like polyelectrolyte," Polymer Preprints (2007), 48(2), 748-749, Chem Abstract 149: 268528.

Shigekura et al., "Anisotropic gelation Seeded by a rod-like polyelectrolyte," Macromolecules (2007), 40(7), 12477-2485, Chem Abstract 146: 482503.

ORGANIC COMPOUND, OPTICAL FILM AND METHOD OF PRODUCTION THEREOF

CONTINUING DATA

This application is a DIV of Ser. No. 12/426,326 filed Apr. 20, 2009 ABN Which claims benefit of 61/047,674 filed on Apr. 24, 2008.

FIELD OF THE INVENTION

The present invention relates generally to the field of organic chemistry and particularly to the organic films with phase-retarding properties for displays. More specifically, the present invention is related to the conjugated organic compounds capable of forming a rod-like macromolecule and manufacture of the optical films based on these compounds.

BACKGROUND OF THE INVENTION

Liquid crystals are widely used in electronic optical displays. In such display systems, a liquid crystal cell is typically situated between a pair of crossed polarizing plates. For transmissive LCDs light from the backlight source is polarized by a first polarizer and transmitted through a liquid crystal cell, where its polarization state is affected according to the molecular orientation of the liquid crystal that can be controlled by applying a voltage across the cell. Then, light having altered polarization state is transmitted through a second polarizer. By employing this scheme, the transmission of light from backlight source can be controlled and the gray-scale can be obtained. The energy required to provide for this control is generally much lower than that required for controlling the emission from luminescent materials used in other types of display such as cathode ray tubes (CRTs). Accordingly, liquid crystal technology is used in a number of electronic imaging devices, including (but not limited to) digital watches, calculators, portable computers, and electronic games, for which small weight, low power consumption, and long working life are important.

The contrast, color reproduction (color rendering), and stable gray scale intensity gradation are important quality characteristics of electronic displays that employ liquid crystal technology. The primary factor determining the contrast of a liquid crystal display (LCD) is the quantity of light transmitted by the display, which is in the dark or "black" pixel state. In addition, this light leakage and, hence, the contrast of an LCD also depend on the direction from which the display screen is viewed. Viewing direction is defined as a set of polar viewing angle θ and azimuthal viewing angle φ. The polar viewing angle θ is measured from display normal direction and the azimuthal viewing angle φ is measured in the plane of the display with respect to an appropriate reference direction. Typically, the optimum contrast is observed only within a narrow viewing angle range centered about the normal to the display and falls off rapidly as the polar viewing angle θ is increased. Various display image properties such as contrast ratio, color reproduction, and image brightness are the functions of the angles θ and φ. In color displays, the leakage problem not only decreases the contrast but also causes color or hue shifts with the resulting degradation of color reproduction.

LCDs are replacing CRTs as monitors for television (TV) sets, computers (such as, for example, notebook computers or desktop computers), central control units, and various devices, for example, gambling machines, electro-optical displays, (such as displays of watches, pocket calculators, electronic pocket games), and portable data banks (such as personal digital assistants or of mobile telephones). It is also expected that the number of LCD television monitors with a larger screen size will sharply increase in the near future. However, unless problems related to the effect of viewing angle on the coloration, contrast degradation and inversion are solved, the replacement of traditional CRTs by LCDs will be limited.

Thus, the technological progress poses the task of developing optical elements based on new materials with desired controllable properties. In particular, the necessary optical element in modern visual display systems is an optically anisotropic film that is optimised for the optical characteristics of an individual display module.

Various polymer materials are known in the prior art, which are intended for use in the production of optically anisotropic films. Optical films based on these polymers acquire optical anisotropy through uniaxial extension and coloring with organic dyes or iodine. Poly(vinyl alcohol) (PVA) is among commonly used polymers for this purpose. However, a low thermal stability of PVA based optical films limits their applications. PVA based optical films are described in greater detail in Liquid Crystals—Applications and Uses, B. Bahadur (ed.), World Scientific, Singapore—New York (1990), Vol. 1, p. 101.

Synthetic rigid rod polyelectrolytes are used as model objects structurally close to natural rigid-rod polymers such as deoxyribonucleic acid (DNA), proteins, polysaccharides, which are highly capable of forming well-ordered structures by spontaneous self-assembly, which is fundamental to invoke their biological functions. Since the natural rigid-rod polyelectrolytes are difficult to extract without denaturation, synthetic analogues can be studied to investigate some aspects of self-assembling properties in aqueous solutions. Shear-induced mesophase organization of synthetic polyelectrolytes in aqueous solution was described by Takafumi Funaki, Tatsuo Kaneko et al. in *Langmuir*, 2004, val. 20, pp. 6518-6520. Water-soluble polymer with a completely rigid-rod elementary structure, poly(2,2'-disulfonylbenzidine terephtalamide) (PBDT), was prepared by an interfacial polycondensation reaction according to the procedure known in the prior art. GPC measurement showed that the number-average molecular weight, Mn, weight-average molecular weight, Mw, and poly-dispersity (Mw/Mn) were 44 000, 63 500, and 1.4, respectively. Because a concentrated aqueous solution of PBDT (more than 5 wt %) was translucent, authors of this paper made an optical microscopic observation of this solution under the crossed polarizer at room temperature. The strong birefringence of the nematic phase has been shown. These results were observed in the concentration range of 2.8-5.0 wt %. Wide angle X-ray diffraction study indicated that PBDT under the nematic state showed an inter-chain spacing, d, of 0.30-0.34 nm ($2\theta=28.0\pm2.0°$; θ is diffraction angle), which is constant regardless of the concentration (2.8-5.0 wt %). The d value is shorter than that of the ordinary nematic polymers (0.41-0.45 nm), suggesting that PBDT rods have a strong inter-chain interaction in the nematic state to form the bundle-like structure despite the electrostatic repulsion of sulfonate anions.

Rigid rod, water-soluble polymers are described by N. Sarkar and D. Kershner in Journal of Applied Polymer Science, Vol. 62, pp. 393-408 (1996). The authors of this paper pointed out that these polymers are used for many applications such as enhanced oil recovery. For these applications, it is essential to have an extremely water soluble shear stable polymer that can impart high viscosity at very low concentration for economic reasons. It is known that rigid rod polymers can deliver high viscosity at low molecular weight compared with the traditionally used flexible chain polymers such as a hydrolyzed poly-acrylamides. Polymers with helical or double stranded conformations may be considered as truly rigid rod in solution. New sulfonated water soluble aromatic polyamides, polyureas, and polyimides were prepared via interfacial or solution polymerization of sulfonated aromatic diamines with aromatic dianhydrides, diacid chlorides, or phosgene. Some of these polymers had sufficiently high molecular weight (<200,000), extremely high intrinsic viscosity (~65 dL/g), and appeared to transform into a helical coil in salt solution. These polymers have been evaluated in applications such as thickening of aqueous solutions, flocculation and dispersion stabilization of particulate materials, and membrane separation utilizing cast films.

The synthesis and solution properties of some rigid-chain, water-soluble polymers (poly[N,N'-(sulfo-phenylene) phthalamidels and poly[N,N'-(sulfo-p-phenylene) pyromellitimide]) are described by E. J. Vandenberg et al in Journal of Polymer Science: Part A: Polymer Chemistry, Vol. 27, pp. 3745-3757 (1989). Poly[N,N'-(sulfo-phenylene)phthalamidles and poly[N,N'-(sulfo-p-phenylene)pyromellitimidel were prepared in water-soluble form and were found to have unique solution properties, similar in some respects to xanthan. The most investigated polymer, poly[N,N'-(sulfo-p-phenyl-ene)terephthalamide] (PPT-S), is produced as the dimethylacetamide (DMAC) salt by the solution polymerization of 2,5-diaminobenzenesulfonic acid with terephthaloyl chloride in DMAC containing LiCl. The isolated polymer requires heating in water to dissolve; the resulting cooled solutions are viscous or gels at concentrations as low as 0.4%. They are highly birefringent, exhibit circular dichroism properties, and are viscosity-sensitive to salt. Solutions of this polymer mixed with those of guar or hydroxyethyl cellulose give significantly enhanced viscosity. The polymer is relatively low molecular weight, ca. 5000 estimated from viscosity data. Some meta and para isomeric analogs of PPT-S were prepared; these polymers have similar properties except they are more soluble in water, and higher concentrations are required to obtain significant viscosity. Poly[N,N'-(sulfo-p-phenylene) pyromellitimide] (PIM-S) was prepared similarly from 2,5-diaminobenzenesulfonic acid and pyromellitic dianhydride. Its aqueous solution properties are similar to those of PPT-S. It appears that these relatively low-molecular-weight rigid-chain polymers associate in water to form a network that results in viscous solutions at low concentrations.

Effect of phenylene content on optical, spectral, and solubility properties is described by H. G. Rogers, R. A. Caudiana in Journal of Polymer Science: Polymer Chemistry Edition, vol. 23, pp. 2669-2678 (1985) and in U.S. Pat. No. 4,521,588. In these publications an optical device includes a transparent molecularly oriented highly birefringent polymer. Said highly birefringent polymer comprises repeating molecular units exhibiting high electron density substantially cylindrically distributed about the long axes of the polymer and the repeating units thereof. The highly birefringent polymer is substantially optically uniaxial exhibiting only two indices of refraction. The molecularly oriented highly birefringent polymer comprises recurring units of the formula:

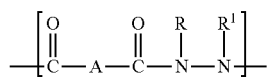

wherein R and $R^1$ are each hydrogen, alkyl, aryl, alkaryl or aralkyl, and A is a divalent radical selected from the group consisting of (1) a radical

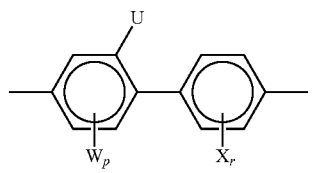

where U is a substituent other than hydrogen, each W is hydrogen or a substituent other than hydrogen, p is an integer from 1 to 3, each X is hydrogen or a substituent other than hydrogen and r is an integer from 1 to 4, said U, $W_p$ and $X_r$ substitution being sufficient to provide the radical with a non-coplanar molecular configuration; and (2) a radical

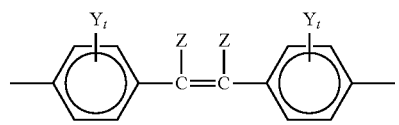

where each of Y and Z is hydrogen or a substituent other than hydrogen and each t is an integer from 1 to 4, with the proviso that when each Z is hydrogen, at least one Y substituent is a substituent other than hydrogen positioned on the corresponding nucleus ortho with respect to the

The moiety of the radical, Z and Yt substitution are sufficient to provide the radical with a non-coplanar molecular configuration.

While the monomer or monomers to be polymerized can be dissolved in a suitable amide or urea solvent and allowed to react with formation of the desired polymeric material, a preferred reaction sequence where a mixture of copolymerizable monomers is utilized involves the preparation of a solution of a first monomer in the amide or urea solvent and the addition thereto of a second or other monomer or a solution thereof in a suitable organic solvent, such as tetrahydrofuran. External cooling of the resulting reaction mixture provides the desired polyamide material in high molecular weight and minimizes the production of undesired side reactions or by-products.

The polyamide materials prepared as described can be recovered by combining the polymerization reaction mixture with a non-solvent for the polymer and separating the polymer, as by filtration. This can be effectively accomplished by blending the polymerization mixture with water and filtering the solid polyamide material. The polyamide can be washed with an organic solvent such as acetone or ether and dried, for example, in a vacuum oven.

The polymeric materials utilized in the devices according to these references can be formed or shaped into various films, sheets, coatings, layers, fibrils, fibers or the like. For example, a solution of a substituted polyamide as described hereinbefore, in a solvent material such as N,N-dimethylacetamide, optionally containing lithium chloride solubilizing agent, can be readily cast onto a suitable support material for the formation of a polymeric film or layer of the polyamide material. The polymeric film can be utilized for the production of a birefringent polymeric film or sheet material which can be utilized in an optical device of the invention. Thus, a polymeric film or sheet material can be subjected to stretching so as to introduce molecular orientation and provide a film material having a highly birefringent character.

Known shaping or forming methods can be utilized for the orientation of polymeric materials according to these references. Preferably, this will be accomplished by unidirectional stretching of a polymeric film, by extrusion of the polymer into a sheet, layer or other stretched form, or by the combined effects of extrusion and stretching. In their oriented state, the polymers utilized herein exhibit unusually high birefringence.

Extensive investigations aimed at developing new methods of fabricating dye-based films through variation of the film deposition conditions have been described in U.S. Pat. Nos. 5,739,296 and 6,174,394 and in published patent application EP 961138. Of particular interest is the development of new compositions of lyotropic liquid crystals utilizing modifying, stabilizing, surfactant and/or other additives in the known compositions, which improve the characteristics of LC films.

There is increasing demand for anisotropic films with improved selectivity in various wavelength ranges. Films with different optical absorption maxima over a wide spectral interval ranging from infrared (IR) to ultraviolet (UV) regions are required for a variety of technological applications. Hence, much recent research attention has been directed to the materials used in the manufacturing of isotropic and/or anisotropic birefringent films, polarizers, retarders or compensators (herein collectively referred to as optical materials or films) for LCD and telecommunications applications, such as (but not limited to) those described in P. Yeh, Optical Waves in Layered Media, New York, John Wiley &Sons (1998) and P. Yeh, and C. Gu, Optics of Liquid Crystal Displays, New York, John Wiley &Sons, (1999).

It has been found that ultra-thin birefringent films can be fabricated using the known methods and technologies to produce optically anisotropic retardation layers composed of organic dye LLC systems. In particular, the manufacture of thin crystalline optically anisotropic layers based on disulfoacids of the cis- and trans-isomeric mixtures of dibenzimidazoles of naphthalenetetracarboxylic acid has been described by P. Lazarev and M. Paukshto, Thin Crystal Film Retarders (in: Proceeding of the 7th International Display Workshops, Materials and Components, Kobe, Japan, Nov. 29-Dec. 1 (2000), pp. 1159-1160).

This technology makes it possible to control the direction of the crystallographic axis of an optical film during application and crystallization of LC molecules on a substrate (e.g., on a glass plate). The obtained films have uniform compositions and high molecular and/or crystal ordering with, which makes them useful optical materials, in particular, for polarizers and birefringent films or retarders (compensators).

SUMMARY OF THE INVENTION

The present invention provides an organic compound of the general structural formula I

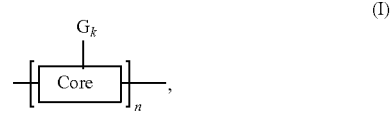

where Core is a conjugated organic unit capable of forming a rod-like macromolecule, n is a number of the conjugated organic units in the rod-like macromolecule, $G_k$ is a set of ionogenic side-groups, and k is a number of the side-groups in the set $G_k$; wherein the set of the ionogenic side-groups provide solubility of the organic compound and its salts and give rigidity to the rod-like macromolecule; the number n provides molecule anisotropy that promotes self-assembling of macromolecules in a solution of the organic compound or its salts, forming lyotropic liquid crystal; and wherein the solution is capable of forming a solid optical retardation layer of positive A-type substantially transparent to electromagnetic radiation in the visible spectral range.

In a further aspect, the present invention provides an optical film comprising a substrate having front and rear surfaces, and at least one solid retardation layer on the front surface of the substrate, wherein the solid retardation layer comprises at least one organic compound of the general structural formula II

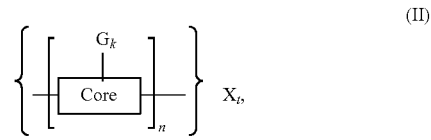

where Core is a conjugated organic unit capable of forming a rod-like macromolecule, n is a number of the conjugated organic units in the rod-like macromolecule, $G_k$ is a set of ionogenic side-groups, k is a number of the side-groups in the set $G_k$, X is a counterion selected from a list comprising $H^+$, $NH_{(3-m)}R_m^+$ (where R is alkyl, m is 1, 2 or 3) $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$ and any combination thereof, t is the number of counterions; wherein the side-groups and the number k provide solubility of the organic compound and give rigidity to the rod-like macromolecule, number n provides molecule anisotropy that promotes self-assembling of macromolecules in a solution of the organic compound or its salts, forming lyotropic liquid crystal; wherein the solid retardation layer is an uniaxial positive A-type layer and is substantially transparent to electromagnetic radiation in the visible spectral range.

In yet further aspect, the present invention provides a method of producing an optical film, comprising the steps of a) preparation of a nematic lyotropic liquid crystal solution of an organic compound of the general structural formula I or a salt thereof

where Core is a conjugated organic unit capable of forming a rod-like macromolecule, n is a number of the conjugated organic units in the rod-like macromolecule, $G_k$ is a set of ionogenic side-groups, and k is a number of the side-groups in the set $G_k$; wherein the side-groups and the number k provide solubility of the organic compound and its salts and give rigidity to the rod-like macromolecule, and the number n provides molecule anisotropy that promotes self-assembling of macromolecules in a solution of the organic compound or their salt, forming lyotropic liquid crystal;

b) application of a liquid layer of the solution onto a substrate, wherein the liquid layer is substantially transparent to electromagnetic radiation in the visible spectral range;

c) application of an external alignment action onto said liquid layer; and d) drying to form a solid retardation layer.

DETAILED DESCRIPTION OF THE INVENTION

Figure 1:
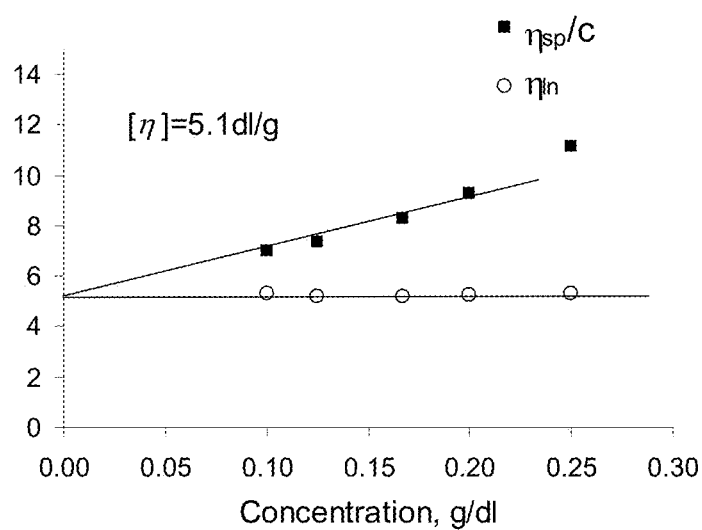
FIG. 1 shows reduced and inherent viscosity measured as a function of polymer concentration in aqueous solution.

The general description of the present invention having been made, a further understanding can be obtained by reference to the specific preferred embodiments, which are given herein only for the purpose of illustration and are not intended to limit the scope of the appended claims.

Definitions of various terms used in the description and claims of the present invention are listed below.

The term "visible spectral range" refers to a spectral range having the lower boundary approximately equal to 400 nm, and upper boundary approximately equal to 750 nm.

The term "retardation layer" refers to an optically anisotropic layer which is characterized by three principal refractive indices ($n_x$, $n_y$ and $n_z$), wherein two principal directions for refractive indices $n_x$ and $n_y$ belong to xy-plane coinciding with a plane of the retardation layer and one principal direction for refractive index ($n_z$) coincides with a normal line to the retardation layer, and wherein at least two of principal refractive indices are different.

The term "optically anisotropic retardation layer of positive A-type" refers to an uniaxial optic layer which refractive indices $n_x$, $n_y$, and $n_z$ obey the following condition in the visible spectral range: $n_z=n_y<n_x$.

The above mentioned definitions are invariant to rotation of system of coordinates (of the laboratory frame) around of the vertical z-axis for all types of anisotropic layers.

As used herein, a "front surface" of a substrate refers to a surface facing a viewer. A "rear surface" refers to the opposite surface of the front surface.

In some embodiments, an organic compound of the general structural formula I is provided:

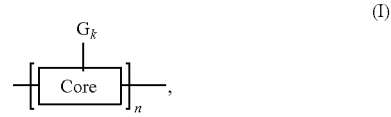
(I)

where Core is a conjugated organic unit capable of forming a rod-like macromolecule, n is a number of the conjugated organic units in the rod-like macromolecule, $G_k$ is a set of ionogenic side-groups, and k is a number of the side-groups in the set $G_k$. The set of the ionogenic side-groups provide solubility of the organic compound and its salts and give rigidity to the rod-like macromolecule. The number n provides a molecule anisotropy that promotes self-assembling of macromolecules in a solution of the organic compound or its salts, forming lyotropic liquid crystal. The solution is capable of forming a solid retardation layer of positive A-type substantially transparent to electromagnetic radiation in the visible spectral range.

In one embodiment of the disclosed organic compound, the number k is equal to 0, 1, 2, 3, 4, 5, 6, 7, or 8 and the number n belongs to the range from 10 to 100000. In another embodiment of the disclosed organic compound, under the increased shear rate the viscosity of the solution decreases down to a value in the range from 10 to 200 mPa·s. In still another embodiment of the disclosed organic compound, the rod-like macromolecule is a polymeric main rigid-chain, wherein the conjugated organic units are the same. In yet another embodiment of the disclosed organic compound, the rod-like macromolecule is a copolymeric main rigid-chain, wherein at least one conjugated organic unit is different from others. In one embodiment of the disclosed organic compound, the number k is more than 1 and the ionogenic side-groups are the same. In another embodiment of the disclosed organic compound, the number k is more than 1 and at least one said side-group is different from others. In still another embodiment of the disclosed organic compound, at least one conjugated organic unit (Core) of the rod-like macromolecule has the general structural formula III:

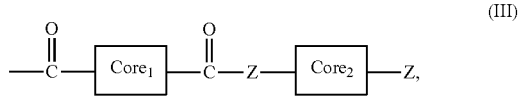
(III)

wherein $Core_1$ and $Core_2$ are conjugated organic components, Z is selected from the list comprising —O— and —NR—, where R is a substituent selected from the list comprising hydrogen, linear and branched $(C_1-C_4)$alkyls, phenyl and substituted phenyl, wherein substituents on the phenyl include linear and branched $(C_1-C_4)$alkyls. In one embodiment of the disclosed organic compound, the conjugated organic components Core1 and Core2 comprise ionogenic groups G independently selected from the structures having general formula 1 to 2 given in Table 1 and can be the same or different

TABLE 1

Examples of the structural formulas of Core1 and Core2 according to the present invention.

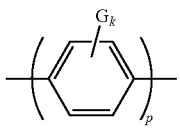  (1)

TABLE 1-continued

Examples of the structural formulas of Core1 and Core2 according to the present invention.

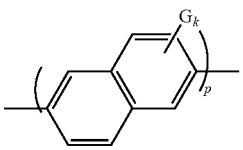  (2)

The ionogenic side-groups G are selected from the list comprising —COOH, —SO$_3$H, and —H$_2$PO$_3$, k is equal to 0, 1 or 2, p is equal to 1, 2 or 3.

In another embodiment of the present invention, the disclosed organic compound comprises an organic compound which is selected from structures 3-7 shown in Table 2.

TABLE 2

Examples of the structural formulas of the organic compounds according to present invention

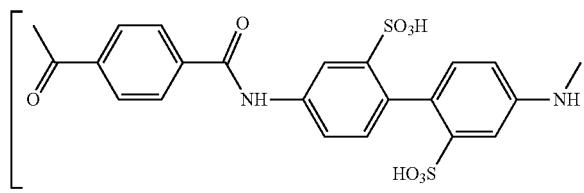  (3)

poly(2,2'-disulfo-4,4'-benzidine terephthalamide)

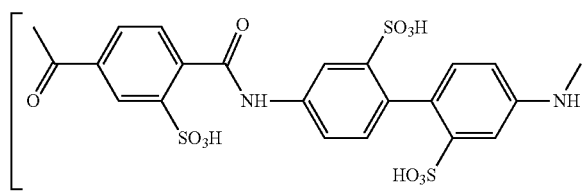  (4)

poly(2,2'-disulfo-4,4'-benzidine sulfoterephtalamide)

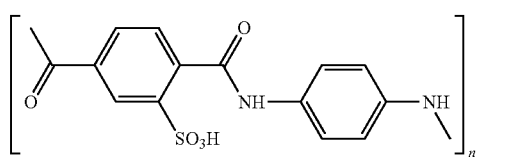  (5)

poly(para-phenylene sulfoterephthalamide)

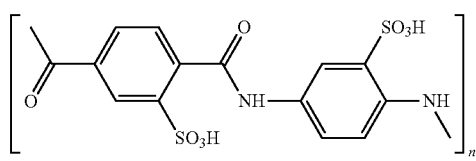  (6)

poly(2-sulfo-1,4-phenylene sulfoterephthalamide)

TABLE 2-continued

Examples of the structural formulas of the organic compounds according to present invention

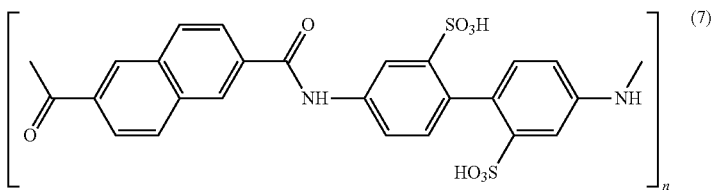

(7)

poly(2,2'-disulfo-4,4'-benzidine naphthalene-2,6-dicarboxamide)

In another embodiment of the present invention, the disclosed organic compound further comprises additional side-groups independently selected from the list comprising linear and branched $(C_1-C_{20})$alkyl, $(C_2-C_{20})$alkenyl, and $(C_2-C_{20})$alkinyl. In another embodiment of the disclosed organic compound, at least one of the additional side-groups is connected with the Core via a bridging group A. In this embodiment of the disclosed organic compound, the bridging group A is selected from the list comprising —C(O)—, —C(O)O—, —C(O)—NH—, —(SO$_2$)NH—, —O—, —CH$_2$O—, —NH—, >N—, and any combination thereof. In still another embodiment of the disclosed organic compound, the salt is selected from the list comprising alkali-metal salts and ammonium salt.

In some embodiments, an optical film is provided. The optical film comprises a substrate having front and rear surfaces. At least one solid retardation layer is provided on the front surface of the substrate. The solid retardation layer comprises at least one organic compound of the general structural formula II:

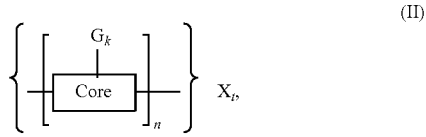

(II)

where Core is a conjugated organic unit capable of forming a rod-like macromolecule, n is a number of the conjugated organic units in the rod-like macromolecule, $G_k$ is a set of ionogenic side-groups, k is a number of the side-groups in the set $G_k$, X is a counterion selected from the list comprising H$^+$, NH$_{(3-m)}$R$_m^+$ (where R is alkyl, m is 1, 2 or 3) Na$^+$, K$^+$, Li$^+$, Cs$^+$, Ba$^{2+}$, Ca$^{2+}$, Mg$^{2+}$, Sr$^{2+}$, Pb$^{2+}$, Zn$^{2+}$, La$^{3+}$, Ce$^{3+}$, Y$^{3+}$, Yb$^{3+}$, Gd$^{3+}$, Zr$^{4+}$ and any combination thereof, t is the number of counterions. The side-groups and the number k provide solubility of the organic compound and give rigidity to the rod-like macromolecule. The number n provides molecule anisotropy that promotes self-assembling of macromolecules in a solution of the organic compound or its salts, forming lyotropic liquid crystal. The solid retardation layer is an uniaxial positive A-type layer and is substantially transparent to electromagnetic radiation in the visible spectral range.

In one embodiment of the disclosed optical film, the number k is equal to 0, 1, 2, 3, 4, 5, 6, 7, or 8 and the number n belongs to the range from 10 to 100000. In another embodiment of the disclosed optical film, under the increased shear rate the viscosity of the solution decreases down to a value in the range from 10 to 200 mPa·s. In still another embodiment of the disclosed optical film, the rod-like macromolecule is a polymeric main rigid-chain, wherein the conjugated organic units are the same. In yet another embodiment of the disclosed optical film, the rod-like macromolecule is a copolymeric main rigid-chain, wherein at least one conjugated organic unit is different from others. In one embodiment of the disclosed optical film, the number k is more than 1, and the ionogenic side-groups are the same. In another embodiment of the disclosed optical film, the number k is more than 1, and at least one side-group is different from others. In still another embodiment of the disclosed optical film, at least one conjugated organic unit (Core) of the rod-like macromolecule has the general structural formula III:

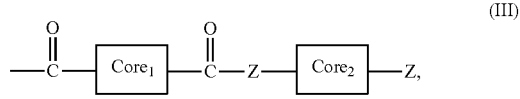

(III)

wherein Core$_1$ and Core$_2$ are conjugated organic components, Z is selected from the list comprising —O— and —NR—, where R is a substituent selected from the list comprising hydrogen, linear and branched $(C_1-C_4)$alkyls, phenyl and substituted phenyl, wherein substituents on the phenyl include linear and branched $(C_1-C_4)$alkyls. In yet another embodiment of the disclosed optical film, the conjugated organic components Core1 and Core2 comprise ionogenic groups G independently selected from the structures having general formula 1 to 2 shown in Table 1 and can be the same or different.

The ionogenic side-groups G are selected from the list comprising —COOH, —SO$_3$H, and —H$_2$PO$_3$, k is equal to 0, 1 or 2, p is equal to 1, 2 or 3. In another embodiment of the present invention, the disclosed optical film comprises an organic compound which is selected from structures 3-7 shown in Table 2. In still another embodiment of the disclosed optical film, the organic compound further comprises additional side-groups independently selected from the list comprising linear and branched $(C_1-C_{20})$alkyl, $(C_2-C_{20})$alkenyl, and $(C_2-C_{20})$alkinyl. In this embodiment of the disclosed optical film, at least one of the additional side-groups is connected with the Core via a bridging group A. The bridging group A may be selected from the list comprising —C(O)—, —C(O)O—, —C(O)—NH—, —(SO$_2$)NH—, —O—, —CH$_2$O—, —NH—, >N—, and any combination thereof. In one embodiment of the disclosed optical film, the salt is selected from the list comprising alkali-metal salts and ammonium salt. In one embodiment of the present invention, the disclosed optical film further comprises inorganic compounds which are selected from the list comprising hydroxides and salts of alkali metals. In another embodiment of the disclosed optical film, the solid retardation layer is generally an uniaxial retardation layer possessing two refractive indices ($n_x$ and $n_y$) corresponding to two mutually perpendicular directions in the plane of the substrate front surface and one refractive index ($n_z$) in the normal direction to the substrate front surface, and wherein the refractive indices obey the following condition: $n_z = n_y < n_x$, wherein x is the coating direction.

The substrate is preferably transparent to electromagnetic radiation in the visible spectral range. The substrate may comprise a polymer, for example PET (polyethylene terephthalate). In alternative embodiments of the disclosed optical film, the substrate comprises a glass. In one embodiment of the disclosed optical film, the transmission coefficient of the substrate does not exceed 2% at any wavelength in the UV spectral range. In another embodiment of the optical film, the transmission coefficient of the substrate in the visible spectral range is not less than 90%.

In still another possible embodiment of the disclosed optical film, the rear surface of the substrate is covered with an additional antireflection or antiglare coating. In another embodiment of the disclosed invention, the rear surface of the substrate further contains a reflective layer.

The disclosed invention also provides an optical film further comprising an additional adhesive optically transparent layer placed on the reflective layer. The optically clear acrylic adhesives may be used as adhesive material.

In another embodiment of the invention, the optical film further comprises an additional transparent adhesive layer placed on top of the optical film. The transmission coefficients of the adhesive layer do not exceed 2% at any wavelength in the 100-400 nm range. The adhesive layer could be isotropic or anisotropic.

In one embodiment of the disclosed invention, the optical film further comprises a protective coating formed on the adhesive transparent layer.

In certain embodiments of the optical film, the substrate is a specular or diffusive reflector. In another embodiment of the optical film, the substrate is a reflective polarizer. In still another embodiment, the optical film further comprises a planarization layer deposited onto the front surface of the substrate. In yet another embodiment of the invention, the optical film further comprises an additional transparent adhesive layer placed on top of the organic layer. In another possible embodiment of the invention, the optical film further comprises an additional transparent adhesive layer placed on top of the optical film. In one embodiment of the disclosed invention, the optical film further comprises a protective coating formed on the adhesive transparent layer.

In the embodiments of the disclosed optical film wherein the adhesive layer is present, the transmission coefficient of the adhesive layer does not exceed 2% at any wavelength in the UV spectral range. In another embodiment of the disclosed optical film, the transmission coefficient of the adhesive layer in the visible spectral range is not less than 90%. In one aspect, a method of producing an optical film is provided. The method comprises the following steps:

a) preparation of a nematic lyotropic liquid crystal solution of an organic compound of the general structural formula I or a salt thereof

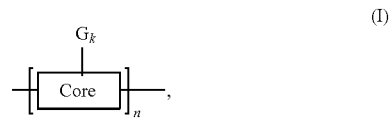

where Core is a conjugated organic unit capable of forming a rod-like macromolecule, n is a number of the conjugated organic units in the rod-like macromolecule, $G_k$ is a set of ionogenic side-groups, and k is a number of the side-groups in the set $G_k$; wherein the side-groups and the number k provide solubility of the organic compound and its salts and give rigidity to the rod-like macromolecule, and the number n provides molecule anisotropy that promotes self-assembling of macromolecules in a solution of the organic compound or its salt, forming lyotropic liquid crystal;

b) application of a liquid layer of the solution onto a substrate, wherein the liquid layer is substantially transparent to electromagnetic radiation in the visible spectral range;

c) application of an external alignment action onto the liquid layer; and d) drying to form a solid retardation layer.

In one embodiment of the disclosed method, the number k is equal to 0, 1, 2, 3, 4, 5, 6, 7, or 8 and the number n belongs to the range from 10 to 100000. In another embodiment of the disclosed method, under the increased shear rate the viscosity of the solution decreases down to a value in the range from 10 to 200 mPa·s. In still another embodiment of the disclosed method, the alignment step is performed simultaneously with the step of application of the liquid layer to the substrate. In yet another embodiment of the disclosed method, the rod-like macromolecule is a polymeric main rigid-chain, wherein the conjugated organic units are the same. In another embodiment of the disclosed method, the rod-like macromolecule is a copolymeric main rigid-chain, wherein at least one conjugated organic unit is different from others. In one embodiment of the disclosed method, the number k is more than 1, and the ionogenic side-groups are the same. In another embodiment of the disclosed method, the number k is more than 1, and at least one said side-group is different from others. In still another embodiment of the disclosed method, at least one conjugated organic unit (Core) of the rod-like macromolecule has the general structural formula III:

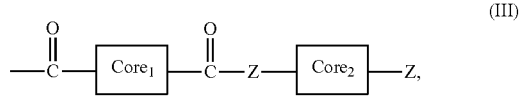

wherein $Core_1$ and $Core_2$ are conjugated organic components, Z is selected from the list comprising —O— and —NR—, where R is a substituent selected from the list comprising hydrogen, linear and branched ($C_1$-$C_4$)alkyls, phenyl and substituted phenyl, wherein substituents on the phenyl include linear and branched ($C_1$-$C_4$)alkyls. In one embodiment of the disclosed method, the conjugated organic components Core1 and Core2 comprise ionogenic groups G independently selected from the structures having general formula 1 to 2 shown in Table 1 and can be the same or different:

The ionogenic side-groups G are selected from the list comprising —COOH, —SO₃H, and —H₂PO₃, k is equal to 0, 1 or 2, p is equal to 1, 2 or 3. In another embodiment of the present invention, the disclosed method uses an organic compound which has the structure selected from structures 3-7 shown in Table 2. In one embodiment of the disclosed method, the liquid layer further comprises a solvent selected from the list comprising water, water-miscible solvent, and any combination thereof. In another embodiment of the disclosed method, the organic compound further comprises the additional side-groups. These additional side-groups are independently selected from the list comprising linear and branched ($C_1$-$C_{20}$)alkyl, ($C_2$-$C_{20}$)alkenyl, and ($C_2$-$C_{20}$)alkinyl. In this embodiment of the disclosed method, at least one of the ionogenic side-groups is connected with the Core via a bridging group A. The bridging group A may be selected from the list comprising —C(O)—, —C(O)O—, —C(O)—NH—, —(SO$_2$)NH—, —O—, —CH2O—, —NH—, >N—, and any combination thereof. In yet another embodiment of the disclosed method, the organic solvent is selected from the list comprising ketones, carboxylic acids, hydrocarbons, cyclohydrocarbons, chlorohydrocarbons, alcohols, ethers, esters, and any combination thereof. In a preferred embodiment of the disclosed method, the organic solvent is selected from the list comprising acetone, xylene, toluene, ethanol, methylcyclohexane, ethyl acetate, diethyl ether, octane, chloroform, methylenechloride, dichloroethane, trichloroethene, tetrachloroethene, carbon tetrachloride, 1,4-dioxane, tetrahydrofuran, pyridine, triethylamine, nitromethane, acetonitrile, dimethylformamide, dimethulsulfoxide, and any combination thereof. In still another embodiment of the present invention, the disclosed solution is a lyotropic liquid crystal solution. In yet another embodiment of the present invention, the solution is an isotropic solution. In one embodiment of the disclosed method, the salt is selected from the list comprising alkali-metal salts and ammonium salt. In the disclosed method the lyotropic liquid crystal may further comprise inorganic compounds which are selected from the list comprising hydroxides and salts of alkali metals. In another embodiment of the disclosed method, the substrate is made of a material selected from the list comprising a polymer and a glass. In the present invention, the disclosed method may further comprise a post-treatment step with a solution of any aqueous-soluble inorganic salt with a cation selected from the list comprising $H^+$, $Ba^{2+}$, $Pb^{2+}$, $Ca^{2+}$, $Mg^{2+}$, $Sr^{2+}$, $La^{3+}$, $Zn^{2+}$, $Zr^{4+}$, $Ce^{3+}$, $Y^{3+}$, $Yb^{3+}$, $Gd^{3+}$ and any combination thereof. In one embodiment of the disclosed method, the application of the liquid layer to the substrate step and the post-treatment step are carried out simultaneously. In another embodiment of the disclosed method, the drying and post-treatment steps are carried out simultaneously. In still another embodiment of the disclosed method, the post-treatment step is carried out after drying. In still another embodiment of the disclosed method, the alignment action on the deposited liquid layer is performed with use of equipment selected from the list comprising Mayer rod, slot die, extrusion, roll coating, curtain coating, knife coating and molding. In one embodiment of the disclosed method, the external alignment action on the deposited layer is performed with the use of mechanical translation over the layer of at least one aligning tool and the distance from the substrate surface to the edge or the plane of the aligning tool is set so as to obtain desired retardation layer thickness. In this method, the aligning tool may be heated. In another embodiment of the disclosed method, the drying step is executed in airflow and/or elevated temperature. In still another embodiment of the present invention, the disclosed method further comprises a pretreatment step before the application onto the substrate. This pretreatment step may comprise the step of making the surface of the substrate hydrophilic. In another embodiment of this method, the pretreatment further comprises application of a planarization layer. In yet another embodiment of the disclosed method, the sequence of the technological steps are repeated two or more times and the solution used in the fabrication of each subsequent solid retardation layer is either the same or different from that used in the previous cycle.

In order that the invention may be more readily understood, reference is made to the following examples, which are intended to be illustrative of the invention, but are not intended to be limiting in scope.

EXAMPLES

Example 1

This example describes synthesis of poly(2,2'-disulfo-4,4'-benzidine terephthalamide) cesium salt (structure #3 in Table 2).

1.377 g (0.004 mol) of 4,4'-diaminobiphenyl-2,2'-disulfonic acid was mixed with 1.2 g (0.008 mol) of CsOH and 40 ml of water and stirred with dispersing stirrer till dissolution. 0.672 g (0.008 mol) of sodium bicarbonate was added to the solution and stirred. While stirring the obtained solution at high speed (2500 rpm) the solution of 0.812 g (0.004 mol) of terephthaloyl dichloride in dried toluene (15 mL) was gradually added within 5 minutes. The stirring was continued for 5 more minutes, and viscous white emulsion was formed. Then the emulsion was diluted with 40 ml of water, and the stirring speed was reduced to 100 rpm. After the reaction mass has been homogenized the polymer was precipitated via adding 250 ml of acetone. Fibrous sediment was filtered and dried.

Gel permeation chromatography (GPC) analysis of the sample was performed with Hewlett-Packard 1050 chromatograph with diode array detector ($\lambda$=230 nm), using Varian GPC software Cirrus 3.2 and TOSOH Bioscience TSKgel G5000 PW$_{XL}$ column and 0.2 M phosphate buffer (pH=7) as the mobile phase. Poly(para-styrenesulfonic acid) sodium salt was used as GPC standard. The number average molecular weight Mn, weight average molecular weight Mw, and polydispersity P were found as $3.9 \times 10^5$, $1.7 \times 10^6$, and 4.4 respectively.

Example 2

This example describes synthesis of poly(2,2'-disulfo-4,4'-benzidine sulfoterephthalamide) (structure #4 in Table 2).

10 g (40 mmol) of 2-sulfoterephtalic acid, 27.5 g (88.7 mmol) of triphenylphosphine, 20 g of LiCl and 50 ml of pyridine were dissolved in 200 ml of NMP in a 500 ml three-necked flask. The mixture was stirred at 40° C. for 15 min and then 13.77 g (40 mmol) of 4,4'-diaminobiphenyl-2, 2'-disulfonic acid was added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 3

This example describes synthesis of poly(para-phenylene sulfoterephthalamide) (structure #5 in Table 2).

10 g (40 mmol) of 2-sulfoterephtalic acid, 27.5 g (88.7 mmol) of triphenylphosphine, 20 g of LiCl and 50 ml of pyridine were dissolved in 200 ml of NMP in a 500 ml three-necked flask. The mixture was stirred at 40° C. for 15 min and then 4.35 g (40 mmol) of 1,4-phenylenediamine was added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 4

This example describes synthesis of poly(2-sulfo-1,4-phenylene sulfoterephthalamide) (structure #6 in Table 2).

10 g (40 mmol) of 2-sulfoterephtalic acid, 27.5 g (88.7 mmol) of triphenylphosphine, 20 g of LiCl and 50 ml of pyridine were dissolved in 200 ml of NMP in a 500 ml three-necked flask. The mixture was stirred at 40° C. for 15 min and then 7.52 g (40 mmol) of 2-sulfo-1,4-phenylenediamine was added. The reaction mixture was stirred at 115° C. for 3 hours. 1 L of methanol was added to the viscous solution, formed yellow precipitate was filtrated and washed sequentially with methanol (500 ml) and diethyl ether (500 ml). Yellowish solid was dried in vacuo at 80° C. overnight. Molecular weight analysis of the sample via GPC was performed as described in Example 1.

Example 5

This example describes synthesis of poly(2,2'-disulfo-4,4'-benzidine naphthalene-2,6-dicarboxamide) cesium salt (structure #7 in Table 2).

0.344 g (0.001 mol) of 4,4'-diaminobiphenyl-2,2'-disulfonic acid was mixed with 0.3 g (0.002 mol) of CsOH and 10 ml of water and stirred with dispersing stirrer till dissolution. 0.168 g (0.002 mol) of sodium bicarbonate was added to the solution and stirred. While stirring the obtained solution at high speed (2500 rpm) the solution of 0.203 g (0.001 mol) of terephthaloyl dichloride in dried toluene (4 mL) was gradually added within 5 minutes. The stirring was continued for 5 more minutes, and viscous white emulsion was formed. Then the emulsion was diluted with 10 ml of water, and the stirring speed was reduced to 100 rpm. After the reaction mass has been homogenized the polymer was precipitated via adding 60 ml of acetone. The fibrous sediment was filtered and dried. Molecular weight analysis of the sample via GPC was performed as described in Example 1.

Example 6

Figure 2:
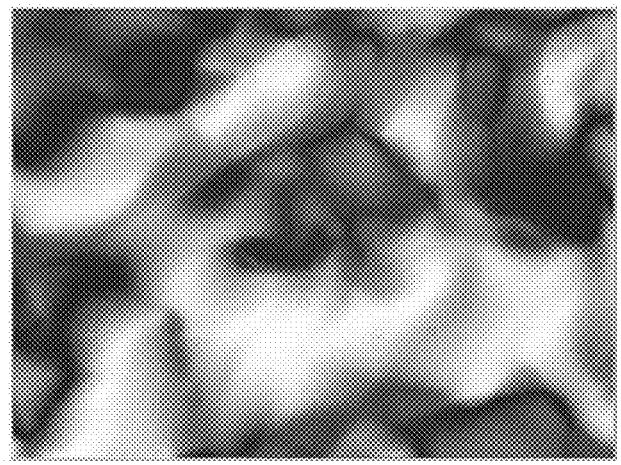
FIG. 2 shows a polarizing microscopy image of the lyotropic liquid crystal solution texture of poly(2,2'-disulfonyl-4,4'-benzidine terephthalamide) synthesized in Cs-form (concentration is equal to 5.6 wt. %)

This example describes the preparation of the organic optical film using a lyotropic liquid crystal solution. The polymer poly(2,2'-disulfonyl-4,4'-benzidine terephthalamide) (structural formula #3 in Table 2) was synthesized as described in Example 1. The polymer was synthesized in a Cs-form. Reduced and inherent viscosity was measured as a function of polymer concentration in aqueous solution containing 0.1N NaCl (measurements performed at 25° C.) (see FIG. 1). Intrinsic viscosity was found equal to 5.1 dl/g. Such a value indicates rather high molecular weight of the product along with a self-assembling in aqueous solution at low concentration (see FIG. 2): phase transition concentration C=4.5 wt %. Lyotropic liquid crystal solution was prepared according to the following procedure: 1% water solution was prepared, filtered from mechanical admixtures, and concentrated to approximately 5.6 wt. % via evaporation.

Figure 3:
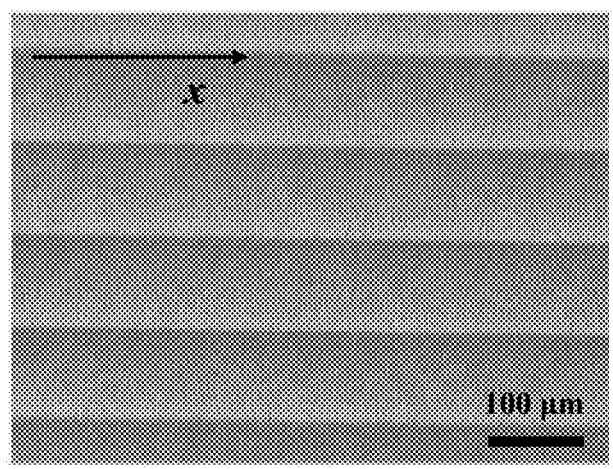
FIG. 3 shows a polarizing microscopy image of the optical film comprising solid optical retardation layer produced with Mayer rod coating method and comprising poly(2,2'-disulfonyl-4,4'-benzidine terephthalamide)

Fisherbrand microscope glass slides were prepared for coating by treating in a 10% NaOH solution for 30 min, rinsing with deionized water, and drying in airflow with the aid of a compressor. The obtained solution was applied at a temperature of 23° C. and a relative humidity of 50% onto the glass plate surface with a Mayer rod #4 moved at a linear velocity of 100 mm/s. The liquid layer of the solution was dried at the same humidity and temperature. The made optical film comprising solid retardation layer of approximate thickness of 180 nm is shown in FIG. 3. The x is a coating direction.

Figure 4:
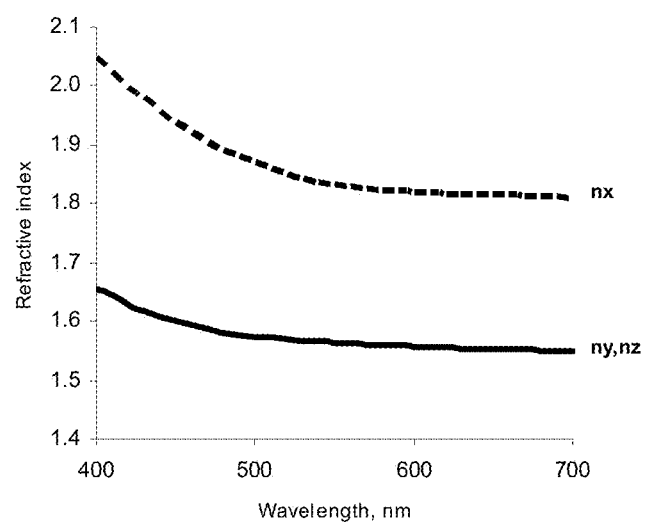
FIG. 4 shows the refractive indices spectra of the organic retardation layer prepared from poly(2,2'-disulfonyl-4,4'-benzidine terephthalamide) (6.0% solution) on a glass substrate.

In order to determine the optical characteristics of the solid retardation layer, the optical transmission and reflection spectra were measured in a wavelength range from approximately 400 to approximately 700 nm using a Cary 500 Scan spectrophotometer. The optical transmission of the solid retardation layer was measured using light beams linearly polarized parallel and perpendicular to the coating direction ($T_{par}$ and $T_{per}$, respectively), propagating in direction perpendicular to the retardation layer plane. The optical reflection was measured using S-polarized light propagating at an angle 12 degree to the normal of the retardation layer plane and polarized parallel and perpendicular to the coating direction ($R_{ear}$ and $R_{per}$, respectively). The phase retardation of the samples was measured at incident angles 0, 30, 45 and 60 degrees using Axometrics Mueller Matrix polarimeter. The obtained data were used to calculate the refractive indices ($n_x$, $n_y$, and $n_z$) presented in FIG. 4. The obtained solid retardation layer was anisotropic in the plane ($n_x$=1.83, $n_y$=1.55, $n_z$=1.55 at wavelength λ=550 nm).

Example 7

Figure 5:
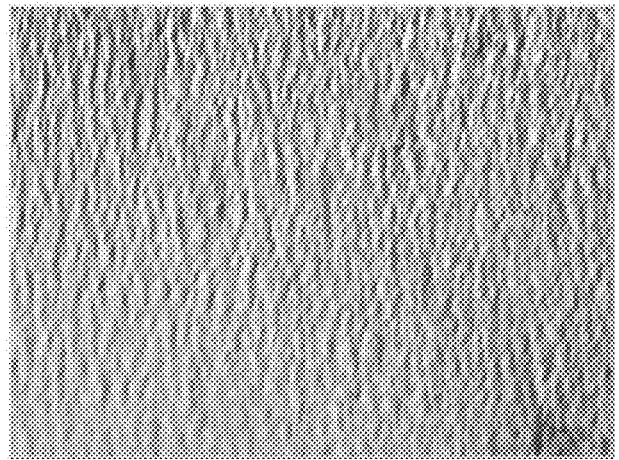
FIG. 5 shows a polarizing microscopy image of the lyotropic liquid crystal solution texture of copolymer of poly(2,2'-disulfonyl-4,4'-benzidine terephthalamide) and poly[imino(2-sulfo-1,4-phenylene)iminocarbonyl-1,4-phenylenecarbonyl] synthesized in Cs-form (concentration is approximately 4 wt %)

This example describes preparation of the organic optical film using a lyotropic liquid crystal solution. The copolymer comprising approximately 70% of poly(2,2'-disulfonyl-4,4'-benzidine terephthalamide) (structural formula #3 in Table 2) and approximately 30% of poly(para-phenylene sulfoterephthalamide) (structural formula #5 in Table 2) was synthesized as described in Example 3. The polymer was synthesized in Cs-form. Lyotropic liquid crystalline solution (FIG. 5) was prepared according to the following procedure: 1% water solution was prepared, filtered in order to rid of mechanical admixtures and concentrated to 4 wt % via evaporation.

Figure 6:
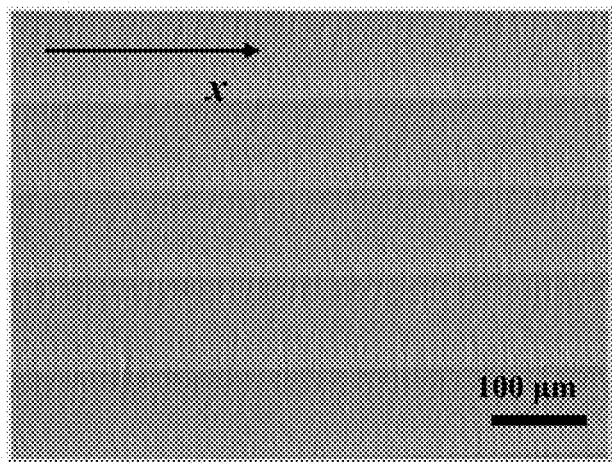
FIG. 6 shows a microscopy image of an optical film comprising a solid optical retardation layer comprising copolymer of poly(2,2'-disulfonyl-4,4'-benzidine terephthalamide) and poly[imino(2-sulfo-1,4-phenylene)iminocarbonyl-1,4-phenylenecarbonyl]

Fisherbrand microscope glass slides were prepared for coating by treating in a 10% NaOH solution for 30 min, rinsing with deionized water, and drying in airflow with the aid of a compressor. The obtained solution was applied at a temperature of 23° C. and a relative humidity of 50% onto the glass plate surface with a Mayer rod #4 moved at a linear velocity of 100 mm/s. The liquid layer of the solution was dried at the same humidity and temperature. The made optical film comprising solid retardation layer of approximate thickness 150 nm was optically characterized using the same procedure as described in Example 1. The obtained solid retardation layer (FIG. 6) was anisotropic in the plane ($n_x$=1.85, $n_y$=1.55, $n_z$=1.55 at a wavelength λ=550 nm). The x is a coating direction.

Example 8

Figure 7:
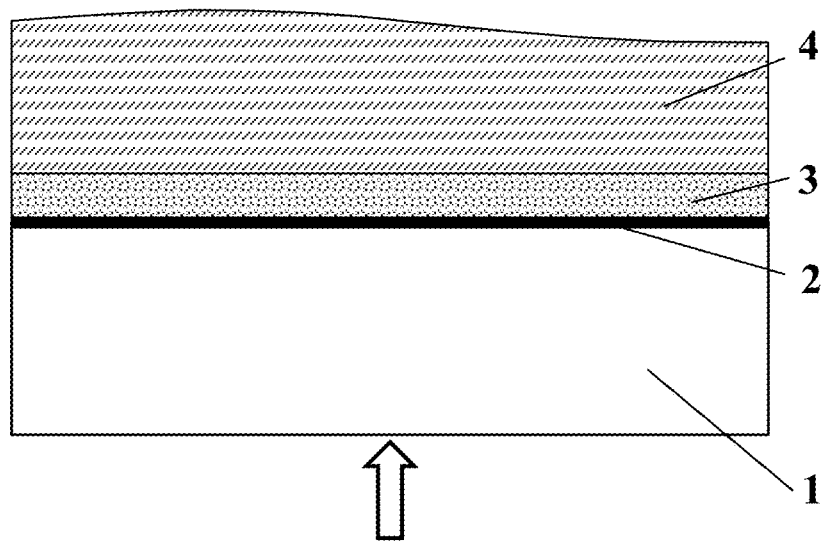
FIG. 7 schematically shows the cross section of an optical film on a substrate, further comprising adhesive and protective layers.

FIG. 7 shows the cross section of an optical film formed on substrate 1. The film contains solid optical retardation layer 2, adhesive layer 3, and protective layer 4. The solid retardation layer may be manufactured using the methods described in Example 1. The polymer layer 4 protects the optical film from damage in the course of its transportation.

This optical film is a semi-product, which may be used as an external retarder in, for example, LCDs. Upon removal of the protective layer 4, the remaining optical film is applied onto an LCD glass with adhesive layer 3.

Example 9

Figure 8:
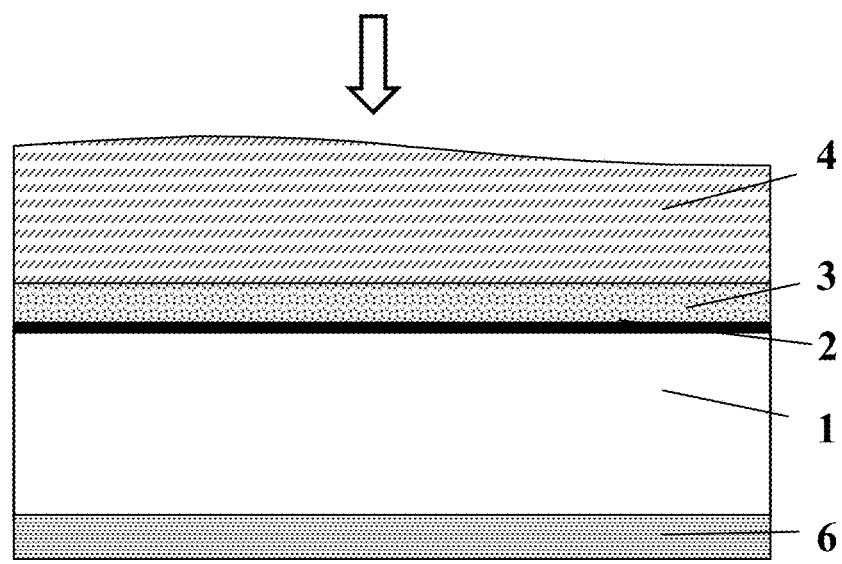
FIG. 8 schematically shows the cross section of an optical crystal film with an additional reflective layer.

With the above described optical film applied to the front surface of an electrooptical device or an LCD, an additional reflective layer 6 can be formed on the substrate (FIG. 8). The reflective layer may be obtained, for example, by depositing an aluminium film.

Example 10

Figure 9:
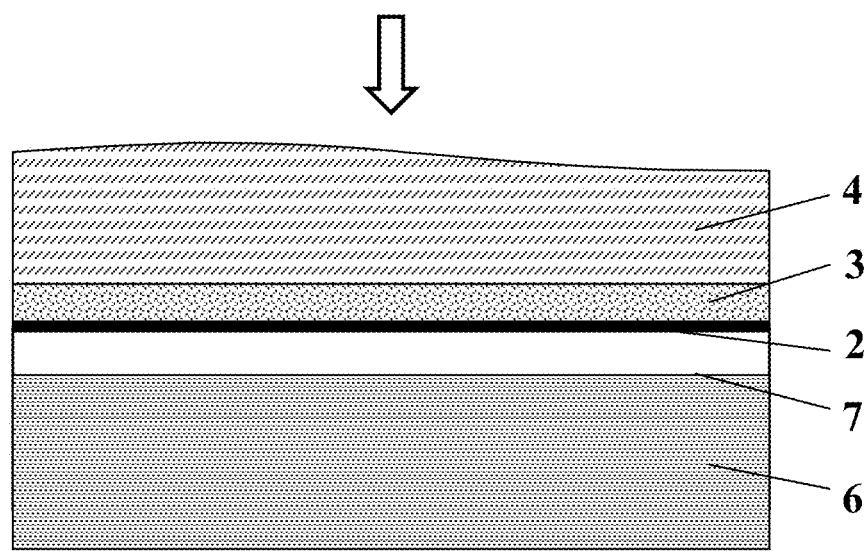
FIG. 9 schematically shows the cross section of an optical film with a diffuse or specular reflector as the substrate.

In this example, the solid retardation layer 2 is applied onto the diffuse or specular semitransparent reflector 6 that serves as a substrate (FIG. 9). The reflector layer 6 may be covered with the planarization layer 7 (optional). Polyurethane or an acrylic polymer or any other material can be used for making this planarization layer.

What is claimed is:

1. An optical film comprising:
    at least one dried solid optical retardation layer,
    wherein the solid optical retardation layer comprises at least one organic compound of structural formula II or its salt

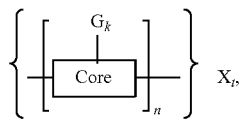

(II)

wherein,
    Core is a conjugated organic unit,
    n is a number of the conjugated organic units,
    $G_k$ is a set of ionogenic side-groups,
    k is a number of the side-groups in the set $G_k$,
    X is a counterion selected from a list consisting of $H^+$, $NH_{(3-m)}R_m^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Ce^{3+}$, $Y^{3+}$, $Yb^{3+}$, $Gd^{3+}$, $Zr^{4+}$, and any combination thereof; wherein, R is —H or alkyl, and m is 1, 2 or 3;
    t is the number of counterions; and
    the organic compound or its salt is a rod-like macromolecule in solution that forms a lyotropic liquid crystal;
    wherein the dried solid optical retardation layer is an uniaxial positive A-type layer and is substantially transparent to electromagnetic radiation in the visible spectral range.

2. The optical film according to claim 1, wherein the number k is equal to 0, 1, 2, 3, 4, 5, 6, 7, or 8 and the number n belongs to the range from 10 to 100000.

3. The optical film according to claim 1, wherein under an increased shear rate the viscosity of a solution of the organic compound or its salt decreases down to a value in the range from 10 to 200 mPa·s.

4. The optical film according to claim 1, wherein the rod-like macromolecule is a polymeric main rigid-chain, and wherein the conjugated organic units are the same.

5. The optical film according to claim 1, wherein the rod-like macromolecule is a copolymeric main rigid-chain, and wherein at least one conjugated organic unit is different from others.

6. The optical film according to claim 1, wherein the number k is more than 1, and the ionogenic side-groups are the same.

7. The optical film according to claim 1, wherein the number k is more than 1, and at least one of said side-group is different from others.

8. The optical film according to claim 1, wherein at least one Core has the general structural formula III:

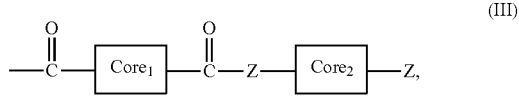

(III)

wherein $Core_1$ and $Core_2$ are conjugated organic components, Z is a substituent selected from the list consisting of —O— and —NR—, wherein R is a substituent selected from the list consisting of hydrogen, linear and branched $(C_1$-$C_4)$alkyls, phenyl, and substituted phenyl, wherein substituents on the phenyl are selected from linear and branched $(C_1$-$C_4)$alkyls.

9. The optical film according to claim 8, wherein $Core_1$ and $Core_2$ are the same or different and are independently selected from the structures of formula (1) and (2):

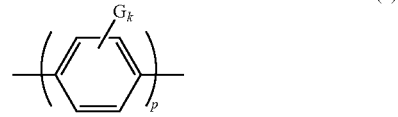

(1)

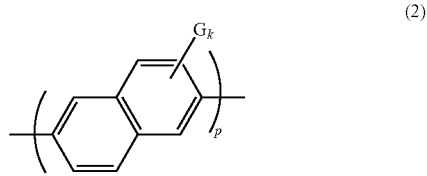

(2)

wherein, G are ionogenic side-groups selected from the list consisting of —COOH, —$SO_3H$, and —$H_2PO_3$; k is equal to 0, 1, or 2; and p is equal to 1, 2, or 3.

10. The optical film according to claim 1, wherein the organic compound is selected from the group consisting of the compounds of structures (3), (4), (5), (6), and (7):

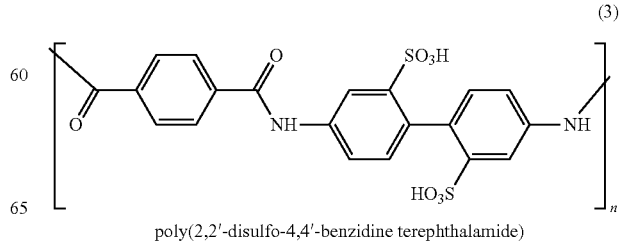

(3)

poly(2,2'-disulfo-4,4'-benzidine terephthalamide)

-continued

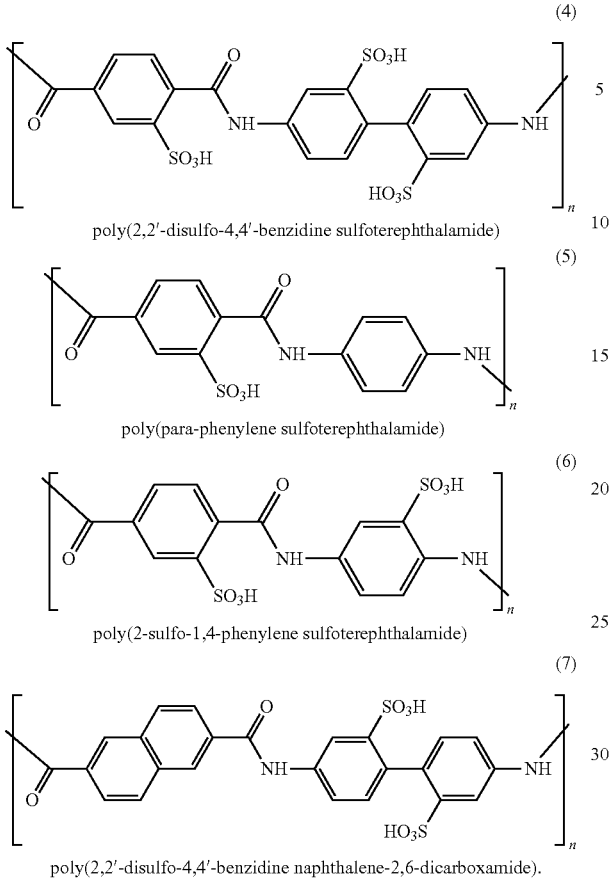

(4) poly(2,2'-disulfo-4,4'-benzidine sulfoterephthalamide)

(5) poly(para-phenylene sulfoterephthalamide)

(6) poly(2-sulfo-1,4-phenylene sulfoterephthalamide)

(7) poly(2,2'-disulfo-4,4'-benzidine naphthalene-2,6-dicarboxamide).

11. The optical film according to claim 1, wherein the organic compound further comprises additional side-groups independently selected from the list consisting of linear and branched ($C_1$-$C_{20}$)alkyl, ($C_2$-$C_{20}$)alkenyl, and ($C_2$-$C_{20}$)alkynyl.

12. The optical film according to claim 11, wherein at least one of the additional side-groups is connected with the Core via a bridging group selected from the list consisting of —C(O)—, —C(O)O—, —C(O)—NH—, —(SO$_2$)NH—, —O—, —CH$_2$O—, —NH—, >N—, and any combination thereof.

13. The optical film according to claim 1, wherein the salt is selected from the list consisting of an alkali-metal salt and an ammonium salt.

14. The optical film according to claim 1, further comprising an inorganic compound selected from the list consisting of an hydroxide and an alkali metal salt.

15. The optical film according to claim 1, wherein said solid retardation layer is on the front surface of a substrate and is an uniaxial retardation layer possessing two refractive indices ($n_x$ and $n_y$) corresponding to two mutually perpendicular directions in the plane of the substrate and one refractive index ($n_z$) in the normal direction to the plane of the substrate, and wherein the refractive indices obey the following condition: $n_z = n_y < n_x$.

16. The optical film according to claim 15, wherein the substrate material is selected from the list comprising a polymer and a glass.

17. A method of producing an optical film, comprising the steps of
a) preparation of a lyotropic liquid crystal solution of an organic compound of structural formula I or a salt thereof

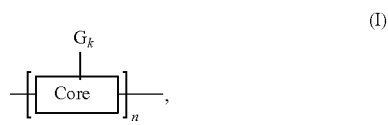

(I)

wherein,
Core is a conjugated organic unit,
n is a number of the conjugated organic units,
$G_k$ is a set of ionogenic side-groups, and
k is a number of the side-groups in the set $G_k$; and
wherein the organic compound or its salt is a rod-like macromolecule in solution that forms a lyotropic liquid crystal;
b) application of a liquid layer of the solution onto a substrate, wherein the liquid layer is substantially transparent to electromagnetic radiation in the visible spectral range;
c) application of an external alignment action onto said liquid layer; and
d) drying to form a dried solid optical retardation layer.

18. The method according to claim 17, wherein the number k is equal to 0, 1, 2, 3, 4, 5, 6, 7, or 8 and the number n belongs to the range from 10 to 100000.

19. The method according to claim 17, wherein under an increased shear rate the viscosity of a solution of the organic compound or its salt decreases down to a value in the range from 10 to 200 mPa·s.

20. The method according to claim 17, wherein the alignment step is performed simultaneously with the step of application of the liquid layer to the substrate.

21. The method according to claim 17, wherein the conjugated organic units are the same.

22. The method according to claim 17, wherein at least one conjugated organic unit is different from others.

23. The method according to claim 17, wherein the number k is more than 1, and the ionogenic side-groups are the same.

24. The method according to claim 17, wherein the number k is more than 1, and at least one said side-group is different from others.

25. The method according to claim 17, wherein at least one Core has the general structural formula III:

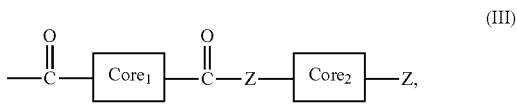

(III)

wherein Core$_1$ and Core$_2$ are conjugated organic components, Z is selected from the list consisting of —O— and —NR—, where R is a substituent selected from the list consisting of hydrogen, linear and branched ($C_1$-$C_4$) alkyls, phenyl and substituted phenyl, wherein substituents on the phenyl are selected from linear and branched ($C_1$-$C_4$)alkyls.

26. The method according to claim 25, wherein Core$_1$ and Core$_2$ are the same or different and independently selected from the structures of formula (1) and (2):

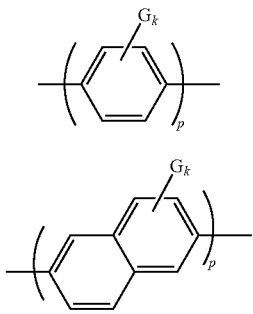

wherein the ionogenic side-groups G are selected from the list consisting of —COOH, —SO$_3$H, and —H$_2$PO$_3$; k is equal to 0, 1 or 2; and p is equal to 1, 2 or 3.

27. The method according to claim 17, wherein the organic compound is selected from the group consisting of the compounds of structures (3), (4), (5), (6), and (7):

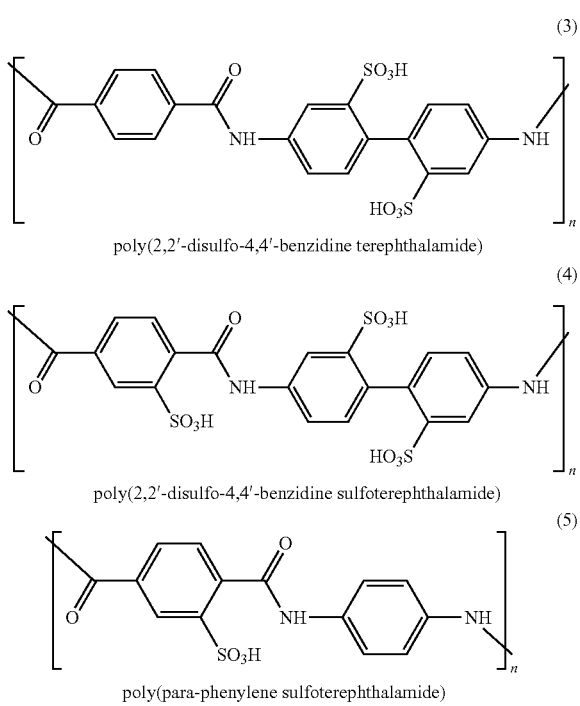

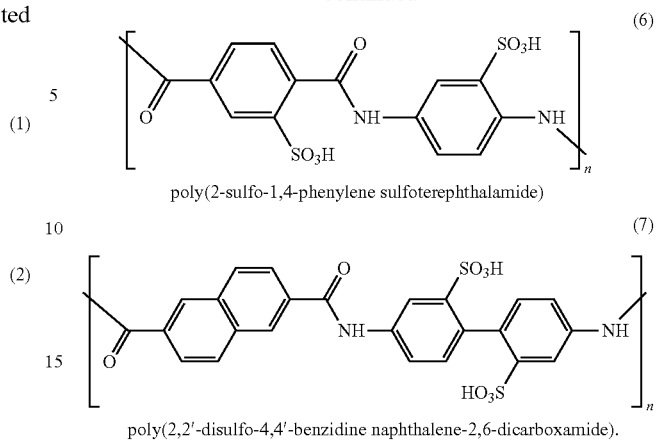

28. The method according to claim 17, wherein the organic compound further comprises additional side-groups independently selected from the list consisting of linear and branched (C$_1$-C$_{20}$)alkyl, (C$_2$-C$_{20}$)alkenyl, and (C$_2$-C$_{20}$)alkynyl.

29. The method according to claim 28, wherein at least one of the additional side-groups is connected with the Core via a bridging group selected from the list consisting of —C(O)—, —C(O)O—, —C(O)—NH—, —(SO$_2$)NH—, —O—, —CH$_2$O—, —NH—, >N—, and combinations thereof.

30. The method according to claim 17, wherein the salt is selected from the list consisting of an alkali-metal salt and an ammonium salt.

31. The method according to claim 17, wherein the substrate is made of a material selected from the list consisting of a polymer and a glass.

32. The method according to claim 17, further comprising a post-treatment step with a solution of any aqueous-soluble inorganic salt with a cation selected from the list consisting of H$^+$, Ba$^{2+}$, Pb$^{2+}$, Ca$^{2+}$, Mg$^{2+}$, Sr$^{2+}$, La$^{3+}$, Zn$^{2+}$, Zr$^{4+}$, Ce$^{3+}$, Y$^{3+}$, Yb$^{3+}$, Gd$^{3+}$ and any combination thereof.

33. The method according to claim 17, wherein application of the external alignment action on the deposited liquid layer is performed with the use of equipment selected from the list consisting of a Mayer rod, slot die, extrusion, roll coating, curtain coating, knife coating, and molding.

34. The method according to claim 17, wherein the sequence of the steps are repeated two or more times and the solution used in the fabrication of each subsequent solid retardation layer is either the same or different from that used in the previous cycle.

* * * * *